United States Patent [19]
Barbier et al.

[11] Patent Number: 5,907,697
[45] Date of Patent: May 25, 1999

[54] EMULATION SYSTEM HAVING A SCALABLE MULTI-LEVEL MULTI-STAGE HYBRID PROGRAMMABLE INTERCONNECT NETWORK

[75] Inventors: Jean Barbier, Chatillon; Olivier Lepape, Paris; Frederic Reblewski, Les Molieres, all of France

[73] Assignee: Mentor Graphics Corporation, Wilsonville, Oreg.

[21] Appl. No.: 08/688,329

[22] Filed: Jul. 30, 1996

Related U.S. Application Data

[63] Continuation-in-part of application No. 08/542,519, Oct. 13, 1995, Pat. No. 5,574,388.

[51] Int. Cl.[6] .................................................. G06F 9/455
[52] U.S. Cl. ........................ 395/500; 364/491; 364/489
[58] Field of Search .................................... 364/488, 489, 364/490, 491, 578; 395/500

[56] References Cited

U.S. PATENT DOCUMENTS

| | | | |
|---|---|---|---|
| 4,786,904 | 11/1988 | Graham, III et al. | 364/488 |
| 4,870,302 | 9/1989 | Freeman | 326/41 |
| 5,329,470 | 7/1994 | Sample et al. | 364/578 |
| 5,424,589 | 6/1995 | Dobbelaere et al. | 326/41 |
| 5,448,496 | 9/1995 | Butts et al. | 364/489 |
| 5,452,231 | 9/1995 | Butts et al. | 364/489 |
| 5,572,710 | 11/1996 | Asano et al. | 364/488 |
| 5,596,742 | 1/1997 | Agarwal et al. | 395/500 |

OTHER PUBLICATIONS

Clos, "A Study of Non–Blocking Switching Networks", The Bell System Technical Journal, Mar. 1953, pp. 406–424.

*Primary Examiner*—Kevin J. Teska
*Assistant Examiner*—Matthew C. Loppnow
*Attorney, Agent, or Firm*—Blakely, Sokoloff, Taylor & Zafman, LLP

[57] ABSTRACT

A scalable multi-level multi-stage network topology is employed to interconnect reconfigurable logic elements within the special purpose FPGA, inter-FPGA, inter-logic boards, and inter-backplanes. More specifically, under the presently preferred embodiment, an on-chip 3-stage inter-logic element crossbar network is provided to each special purpose FPGA for interconnecting the reconfigurable logic elements and the I/O pins of the special purpose FPGA. A two level three-stage inter-FPGA hybrid crossbar network is provided to interconnect the special purpose FPGAs and I/O pins of the logic board. The two-level three-stage inter-FPGA hybrid crossbar network consists of two stages of programmable crossbars and one stage of one or more special purpose FPGAs used for interconnection only. The exact number of special purpose FPGAs to be used for interconnection only on a particular logic board is dependent on the specific circuit design being emulated. A two-level two-stage inter-board crossbar network is provided to interconnect the logic boards or I/O boards for interconnecting the logic elements to external devices. Finally, a single-stage inter-backplane network and a number of PCBs are provided to interconnect multi-backplanes to form a multi-crate system.

8 Claims, 16 Drawing Sheets

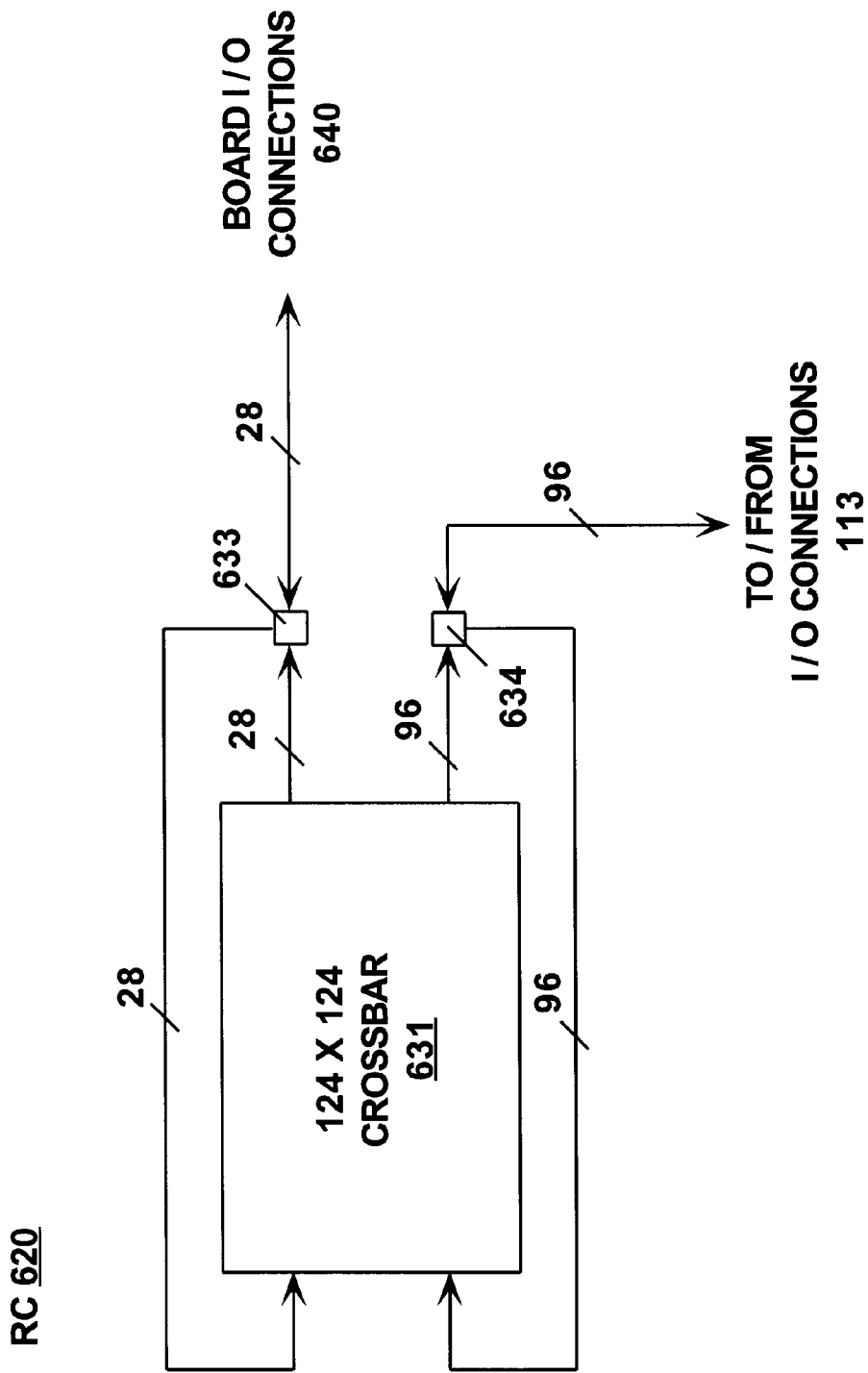

EMULATION SYSTEM HAVING A SCALABLE MULTI-LEVEL MULTI-STAGE HYBRID PROGRAMMABLE INTERCONNECT NETWORK

RELATED APPLICATIONS

This application is a continuation-in-part of application Ser. No. 08/542,519, filed Oct. 13, 1995, now U.S. Pat. No. 5,574,388.

BACKGROUND OF THE INVENTION

1. Field of the Invention

The present invention pertains to the field of emulator design. More particularly, this invention relates to the art of interconnecting the logic elements of an emulator system.

2. Background

With advances in integrated circuit technology, various tools have been developed to aid circuit designers in designing and debugging highly complex integrated circuits. In particular, emulation systems comprising reconfigurable logic elements have been developed for circuit designers to quickly "realize" their designs and emulate operation of the circuits.

Early emulation systems include relatively small number of logic elements, in today's standard. Typically the logic elements are disposed in general purpose field programmable gate arrays (FPGAs). The FPGAs in turn are arranged into a 2-D or 3-D array, and interconnected together directly in a "nearest neighbor" manner or indirectly using full or partial crossbars made of programmable interconnect chips. As is well known in the art, the programmable interconnect paths between the logic elements must be sufficiently "rich" or "flexible", otherwise, the time required to compile or map circuit elements of a circuit design onto the logic elements may become unacceptably long or even down right impossible.

Today, the most highly complex integrated circuits, such as a microprocessor, pack hundreds of thousands of transistors into a very small area. To emulate even a portion of these highly complex integrated circuits would require a very large emulation system having a significantly larger number of reconfigurable logic elements that is of an order of magnitude greater than the emulation systems known in the art just a few years ago.

While there have been significant advances in integration as well as surface mounting technology at the same time, allowing more logic elements to be packed into the general purpose FPGAs and in turn mounted on circuit boards of substantially the same size, it is still impossible to build one of these large emulation systems with a handful of circuit boards. A large number of circuit boards must be employed. It is no longer uncommon to take days or even weeks to compile or map one of these highly complex circuit designs onto a large number of logic elements packaged in a large number of general purpose FPGAs and circuit boards interconnected in a conventional manner, even with today's high performance workstations. Thus, a new and innovative way of packaging and interconnecting these large number of logic elements is clearly desirable.

On the other hand, clearly not all circuit designers require these large emulation systems. Indeed, the market requirement spans a wide spectrum, from the low end entry level systems having a handful of circuit boards, to the intermediate systems having a moderate number of circuit boards, and the high end systems described earlier. Thus, from a manufacturer's perspective, it is further desirable that the new and innovative way of packaging and interconnecting the reconfigurable logic elements be scalable, and works well for the low end systems as well as the high end systems.

Furthermore, it is fully anticipated that integration and surface mounting technology will continue to advance, allowing even more dense integration and packaging. Thus, it is further desirable for the new and innovative way of packaging and interconnecting the reconfigurable logic elements to be easily extensible to take advantage of advances in these technologies.

As will be disclosed in more detail below, the present invention achieves these and other desirable results which will be apparent to those skilled in the art from the description to follow.

SUMMARY OF THE INVENTION

A scalable multi-level multi-stage hybrid programmable interconnect network topology is employed to interconnect reconfigurable logic elements of an emulation system. In addition to the reconfigurable logic elements, advantageously, each special purpose FPGA is provided with an on-chip multi-stage network of programmable interconnect crossbars for interconnecting the reconfigurable logic elements and the input/output (I/O) pins of the special purpose FPGAs.

The special purpose FPGAs are in turn distributively disposed on a number of logic boards. Each logic board is provided with a multi-stage hybrid network of programmable interconnect crossbars for interconnecting the special purpose FPGAs of the logic board and the I/O connections of the logic board. However, advantageously, the first stage of the inter-FPGA network is distributively integrated into the special purpose FPGAs of the logic board, and the last stage is a stage of a variable number of special purpose FPGAs used for interconnection only. The exact number of special purpose FPGAs to be used for interconnection only on a particular logic board is dependent on the specific circuit design being emulated.

A number of the logic boards are in turn coupled to a backplane assembly to form a crate. Each backplane assembly is provided with a multi-stage network of interconnect crossbars for interconnecting the logic boards or I/O boards coupled to the backplane assembly. Collectively, the last stages of the inter-FPGA networks of the logic boards "double up" as the first stage of the inter-logic board network.

Finally, one or more crates are connected together to form a system. For a multi-crate embodiment, another single-stage network of interconnect crossbars is provided for interconnecting the backplane assemblies of the various crates. The single stage is distributively disposed in the backplane assemblies of the various crates. In one embodiment, the various crossbars are correspondingly coupled together using a number of printed circuit boards.

BRIEF DESCRIPTION OF THE DRAWINGS

The present invention is illustrated by way of example and not limitation in the figures of the accompanying drawings, in which like references indicate similar elements and in which:

FIG. 6c is a block diagram showing a routing chip in more detail according to one embodiment of the present invention;

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention. It should be noted that the present invention can be practiced in a variety of manners, such as by fabrication by silicon or gallium arsenide or other processes.

In many of the descriptions which follow reference is made to various specific numeric examples. For example, specific numbers of logic elements, boards, signals, and connections are referenced. It is to be appreciated that these specific numbers are examples only, and that the present invention is not limited to embodiments using only those specific numbers.

Figure 1:
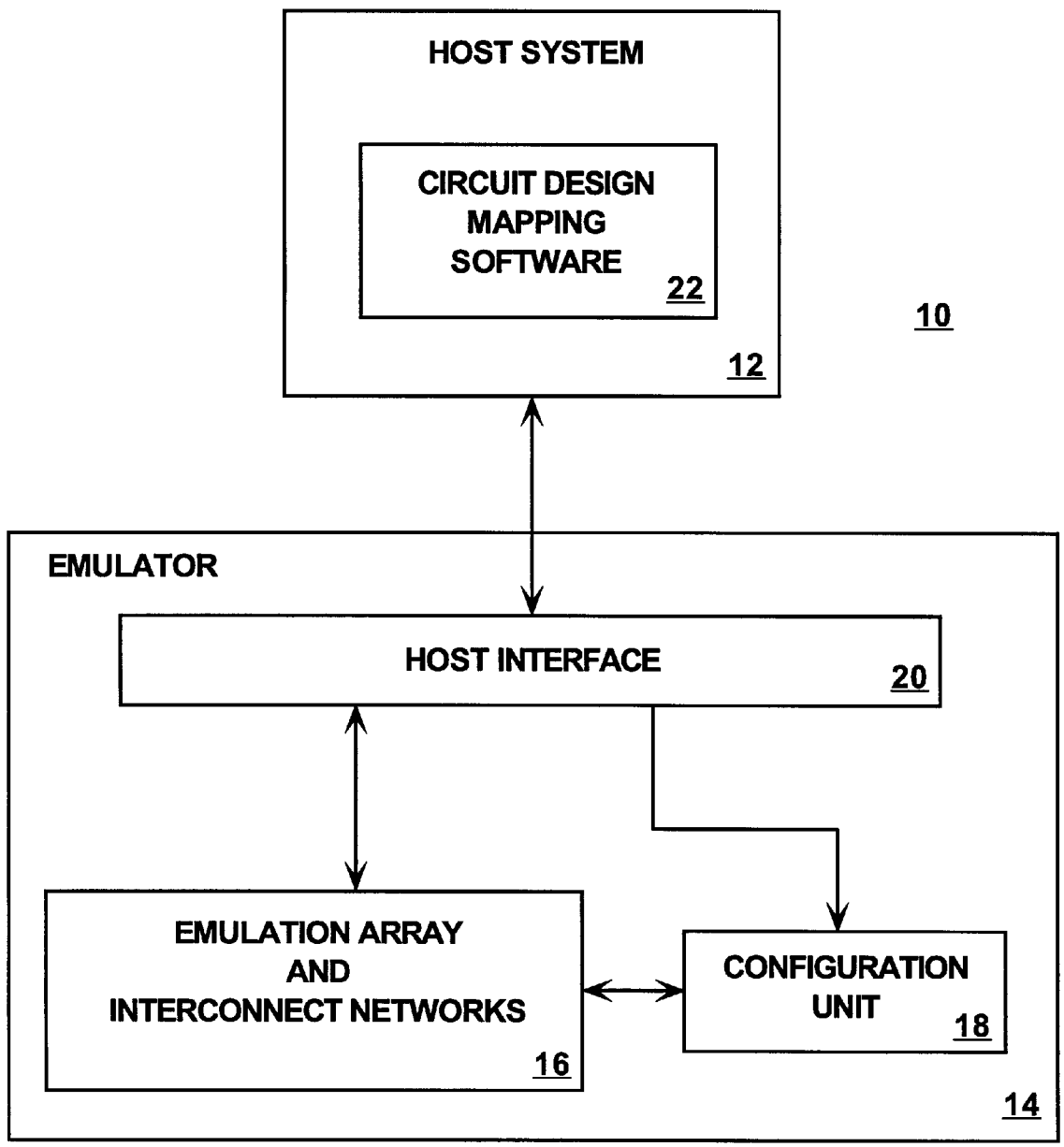
FIG. 1 is a block diagram showing an emulation system which incorporates the teachings of the present invention.

FIG. 1 is a block diagram showing an emulation system which incorporates the teachings of the present invention. As illustrated, an emulation system 10 includes host system 12 and emulator 14. Host system 12 includes in particular circuit design mapping software 22. In one embodiment, circuit design mapping software 22 is implemented in soft-ware. In this embodiment, circuit design mapping software 22 is stored in a suitable storage medium (not shown) of host system 12, and is loaded into memory (not shown) of host system 12 for execution by a processor (not shown) of host system 12. Host system 12 is intended to represent a broad category of host systems found in conventional emulation systems known in the art, and thus will not be discussed further.

Emulator 14 includes emulation array and interconnect networks 16, a configuration unit 18 and host interface 20 coupled to each other as shown. Configuration unit 18 and host interface 20 perform their conventional functions, and are well known in the art. They will not be further described. As will be described in more detail below, emulation array and interconnect networks 16 comprises a number of reconfigurable logic elements (LEs) distributively packaged in a number of special purpose FPGAs, which in turn are distributively packaged in a number of logic boards. A number of logic boards are combined together to form a crate. For multi-crate embodiments, a number of crates are combined together. A scalable multi-level multi-stage network topology is employed to interconnect the LEs together within the special purpose FPGAs, and then the special purpose FPGAs, the logic boards, and the crates.

Figure 2:
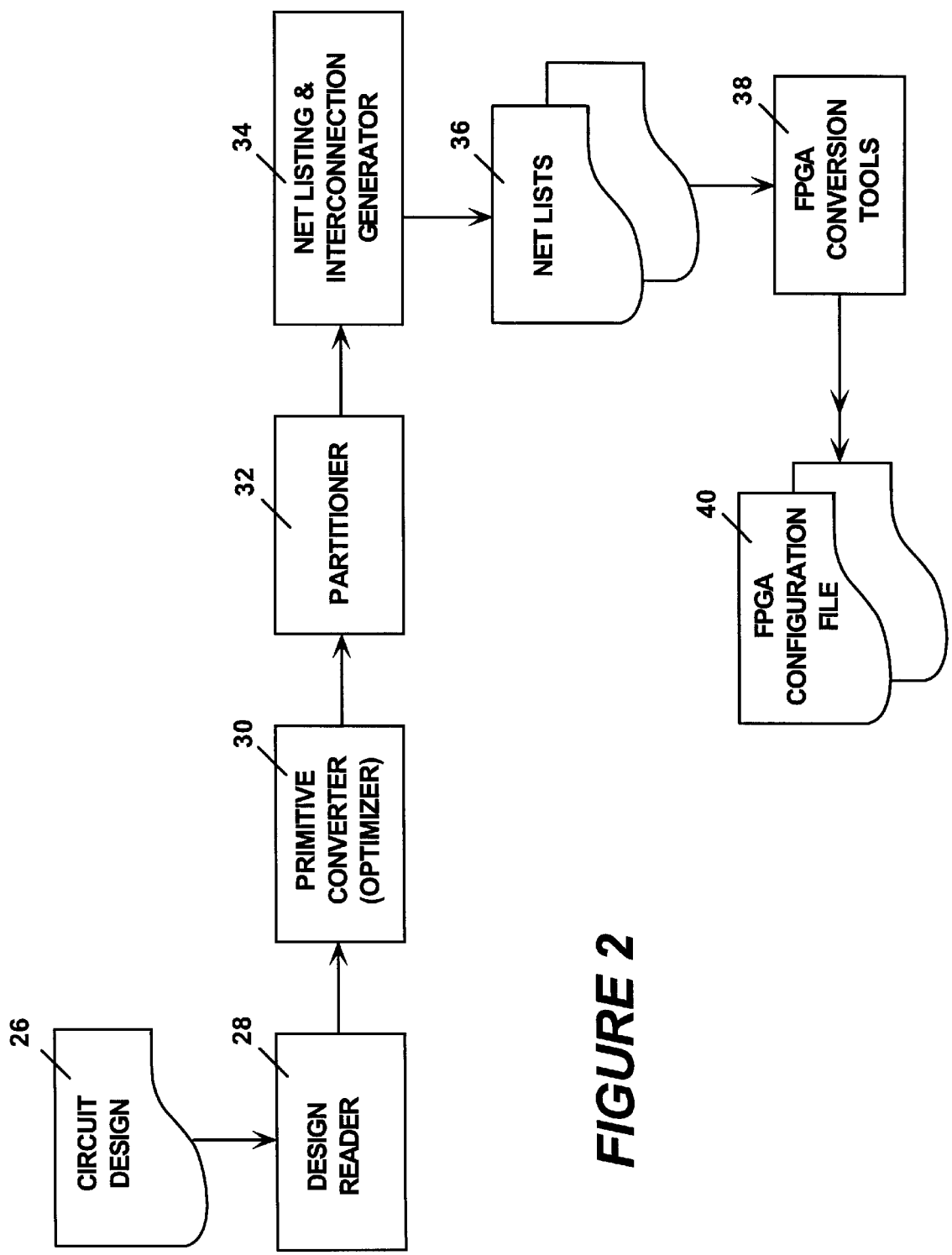
FIG. 2 is a block diagram showing a general flow of programming an emulation system such as may be used with one embodiment of the present invention.

FIG. 2 is a block diagram showing a general flow of programming an emulation system such as may be used with one embodiment of the present invention. As shown, a circuit design 26 is processed by conventional elements of mapping software 22, such as design reader 28, primitive converter 30, partitioner 32, and netlisting and interconnection generator 34 to generate netlists 36, which in turn is processed by field programmable gate array (FPGA) conversion tools 38 of mapping software 22 to generate FPGA configuration files 40. In one embodiment, primitive converter 30 includes an optimizer (not shown) for optimizing the circuit design 26. FPGA configuration files 40 are then used to configure emulator 14 to "realize" circuit design 26 on emulator 14.

Having now described an overview of emulation system 10, we now proceed to describe the special purpose FPGAs employed therein, in particular, the manner in which the LEs of each special purpose FPGA are interconnected to each other and to the I/O connections or pins of the special purpose FPGAs.

Figure 3:
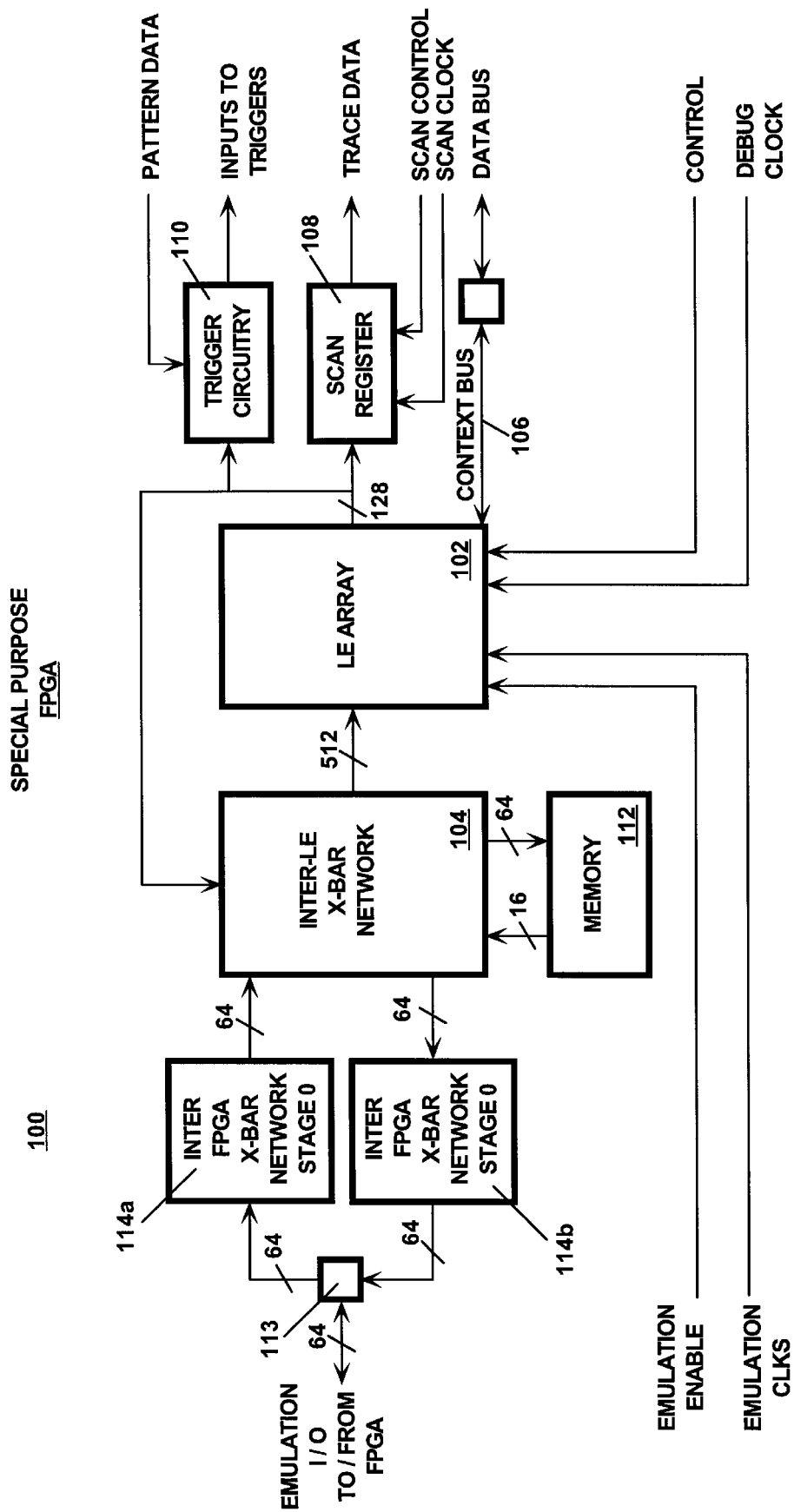
FIG. 3 is a block diagram showing a field programmable gate array which may be used with one embodiment of the present invention.

FIG. 3 is a block diagram showing a special purpose FPGA which may be used with one embodiment of the present invention. Special purpose FPGA 100 includes LE array 102, and I/O pins 113. LE array 102 includes multiple reconfigurable LEs. As is well known in the art, the reconfigurable LEs are used to "realize" various elements of circuit designs, whereas I/O pins 113 are used to provide inputs/outputs to/from special purpose FPGA 100. Each of I/O pins 113 can be statically configured to be either an input or an output pin. This static configuration can be accomplished in any of a wide variety of conventional manners, such as by way of a configuration register.

Preferably, special purpose FPGA 100 also includes memory 112, context bus 106, scan register 108, and trigger circuitry 110. Memory 112 facilitates usage of special purpose FPGA 100 to emulate circuit design with memory elements. Context bus 106, scan register 108 and trigger circuitry 110 provide on-chip integrated debugging facility for special purpose FPGA 100. These elements are described in U.S. patent application Ser. No. 08/542,838, entitled "A Field Programmable Gate Array with Integrated Debugging Facilities", filed Oct. 13, 1995, which is hereby fully incorporated by reference.

More importantly, in accordance to the teachings of the present invention, in lieu of packing as many LEs as possible onto special purpose FPGA 100, inter-LE crossbar network 104 is advantageously integrated into special purpose FPGA 100. Inter-LE crossbar network 104 interconnects the LEs of LE array 102, memory 112, and I/O pins 113 of special purpose FPGA 100, to be described more fully below. Experience has shown that distributing the LEs into more special purpose FPGAs and providing rich on-chip interconnect as well as integrated debugging facilities for the LEs actually achieves an overall improved system performance over the conventional approach of concentrating as many LEs on-chip as possible and then providing the rich interconnect off-chip and debugging facilities off-board.

Additionally, under the presently preferred embodiment, a corresponding portion of inter-FPGA crossbar network stage 0 114a/114b is also advantageously integrated into special purpose FPGA 100, exploiting the "excess" real estate of special purpose FPGA 100[1], resulting in a reduction of logic board size and overall manufacturing cost. The various portions of inter-FPGA crossbar network stage 0 114a/114b together with the remainder of inter-FPGA crossbar network interconnect special purpose FPGAs 100 of a logic board and the I/O connections of the logic board, which will also be described in more detail below.

[1] Typically, the number of LEs to be integrated in each FPGA is scaled in the power of 2, i.e. 64, 128, and 256 etc. Thus, for a given die size, there is often "excess" real estate, after laying out all the essential elements.

In one embodiment, LE array 102 includes 128 reconfigurable LEs, while memory 112 uses 8-bit input and 8-bit output, and special purpose FPGA 100 has 64 I/O pins 113.

Figure 4A:
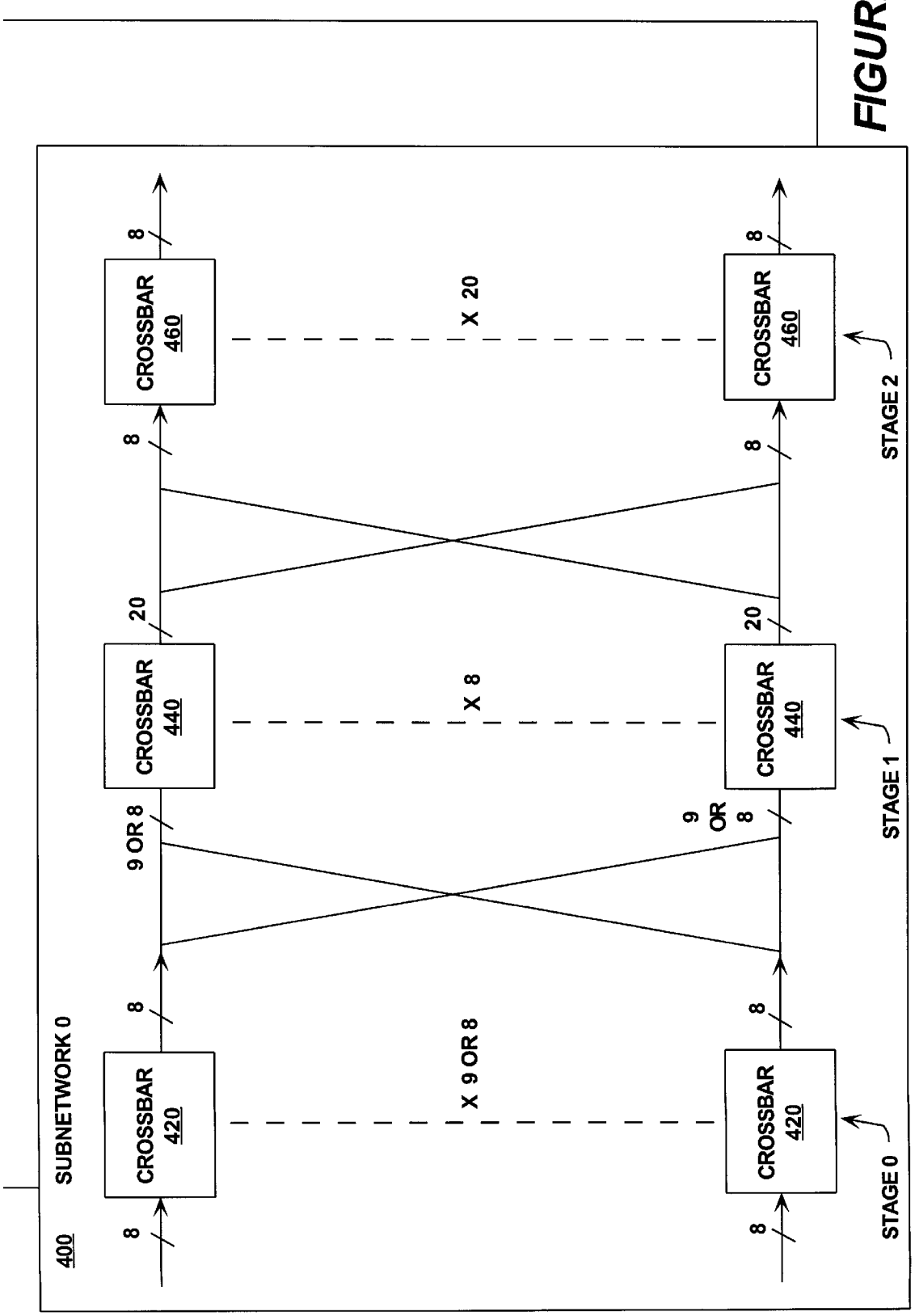
FIG. 4a is a block diagram showing an inter-LE crossbar network according to one embodiment of the present invention.

FIG. 4a is a block diagram showing an inter-LE crossbar network according to one embodiment of the present invention. For the illustrated embodiment, inter-LE crossbar network 104 includes four subnetworks of crossbars 400. A crossbar device is an interconnect device which receives multiple inputs and maps the inputs to multiple outputs of the device. Each input can be mapped to any of the multiple outputs. Which inputs are mapped to which outputs are identified by programming the crossbar device. Such crossbar devices are well known to those skilled in the art and thus will not be described further.

For the illustrated embodiment, the first two subnetworks 400 are used to map 72 inputs to 160 outputs, whereas the second two subnetworks 400 are used to map 64 inputs to 160 outputs. Each subnetwork 400 comprises three stages, stage 0, stage 1, and stage 2. Stage 0 of the first two subnetworks 400 include nine 8×8 crossbars 420, whereas stage 0 of the last two of subnetworks 400 include eight 8×8 crossbars 420. In turn, stage 1 of the first two subnetworks 400 include eight 9×20 crossbars 440, whereas stage 1 of the last two subnetworks 400 include eight 8×20 crossbars 440. Stage 2 of all four subnetworks 400 include twenty 8×8 crossbars 460.

Figure 4B:
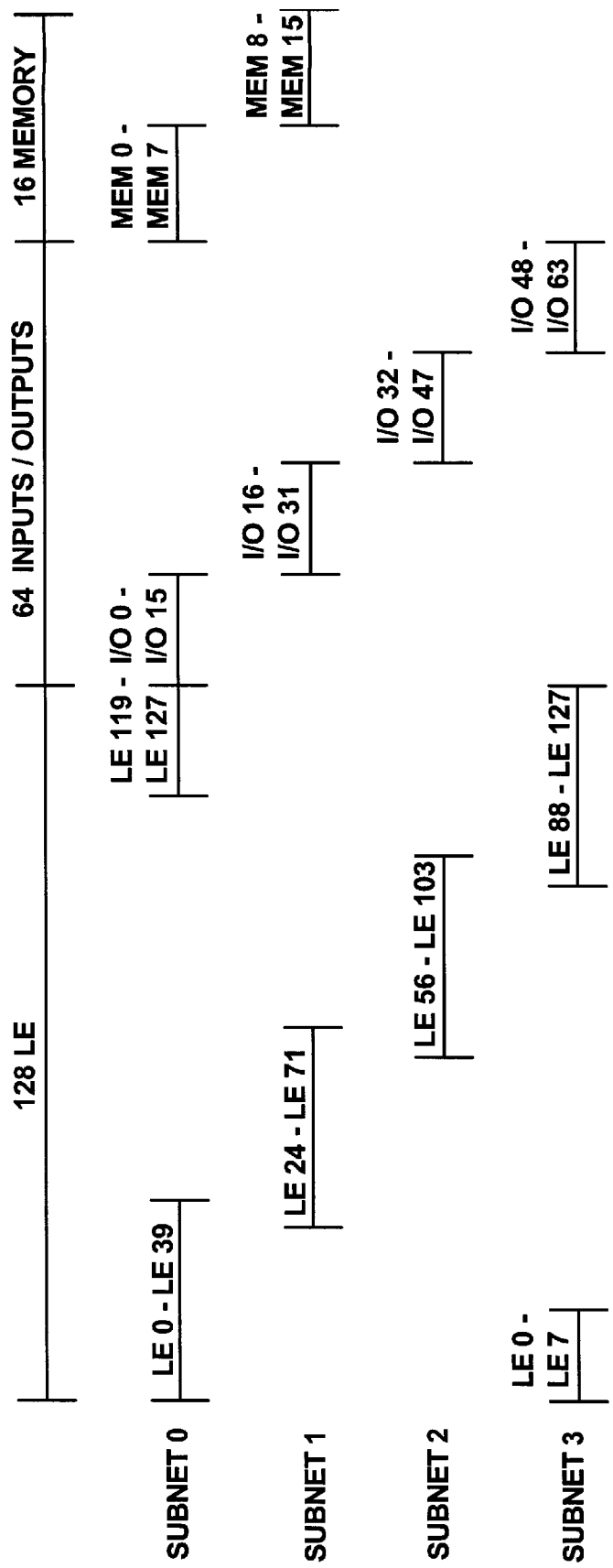
FIG. 4b shows the routing of signals for the inter-LE crossbar network in more detail according to one embodiment of the present invention.

FIG. 4b shows the routing of signals for the subnetworks of FIG. 4a in more detail. Subnetwork0 is used to route the signals of LE0–LE39, LE119–LE127, I/O0–I/O15, and M0–M7. Subnetwork1 is used to route the signals of LE24–LE71, I/O16–I/O31, and M8–M15. Subnetwork2 is used to route the signals of LE56–LE103, and I/O32–I/O47. Subnetwork3 is used to route the signals of LE0–LE7, LE88–LE127, and I/O48–I/O63. The overlapping coverage of the LEs provides increased flexibility of signal routing for mapping circuit designs.

It is to be appreciated that the routing separation of signals shown in FIG. 4b is only an example and that other separations could be used. For example, the sixteen memory signals could be separated as four signals into each of the four subnetworks. By way of another example, each of the subnetworks could route signals for 40 LEs rather than the 48 shown.

Figure 5:
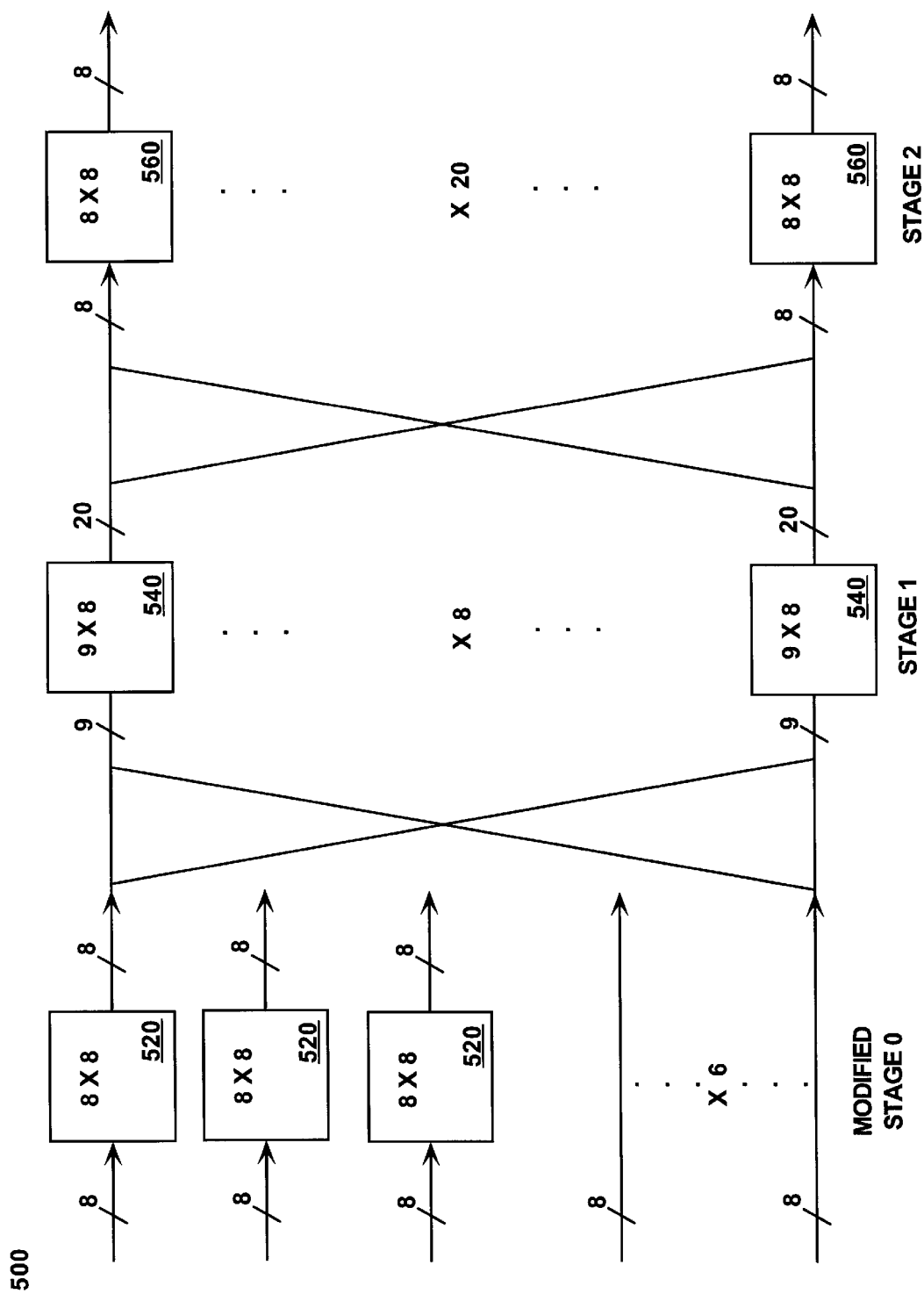
FIG. 5 is a block diagram showing an alternate embodiment of a subnetwork of an inter-LE crossbar network according to one embodiment of the present invention.

FIG. 5 is a block diagram showing an alternate embodiment for each of the first two subnetworks 400 of FIG. 4a. For the embodiment illustrated, six of the nine 8×8 crossbars in stage 0 of subnetwork 400 are eliminated to save space. The remaining three 8×8 crossbars 520 are used for mapping the 16 I/O and 8 memory signals. Every 8 of the 48 LE signals are correspondingly coupled to the 8 crossbars 540 of stage 1, without stage 0 mapping. The "slight" reduction in routing flexibility in turn is compensated by mapping software 22 of host system 12 by swapping the LEs onto which the circuit elements of a circuit design is mapped, if necessary. Such swapping is well within the ability of those skilled in the art, and accordingly will not be further described.

Having now described the special purpose FPGAs including the manner in which their LEs are interconnected on-chip and to the special purpose FPGA I/O pins, we now proceed to describe how the special purpose FPGAs are interconnected together on a logic board and to the logic board's I/O pins.

Figure 6A:
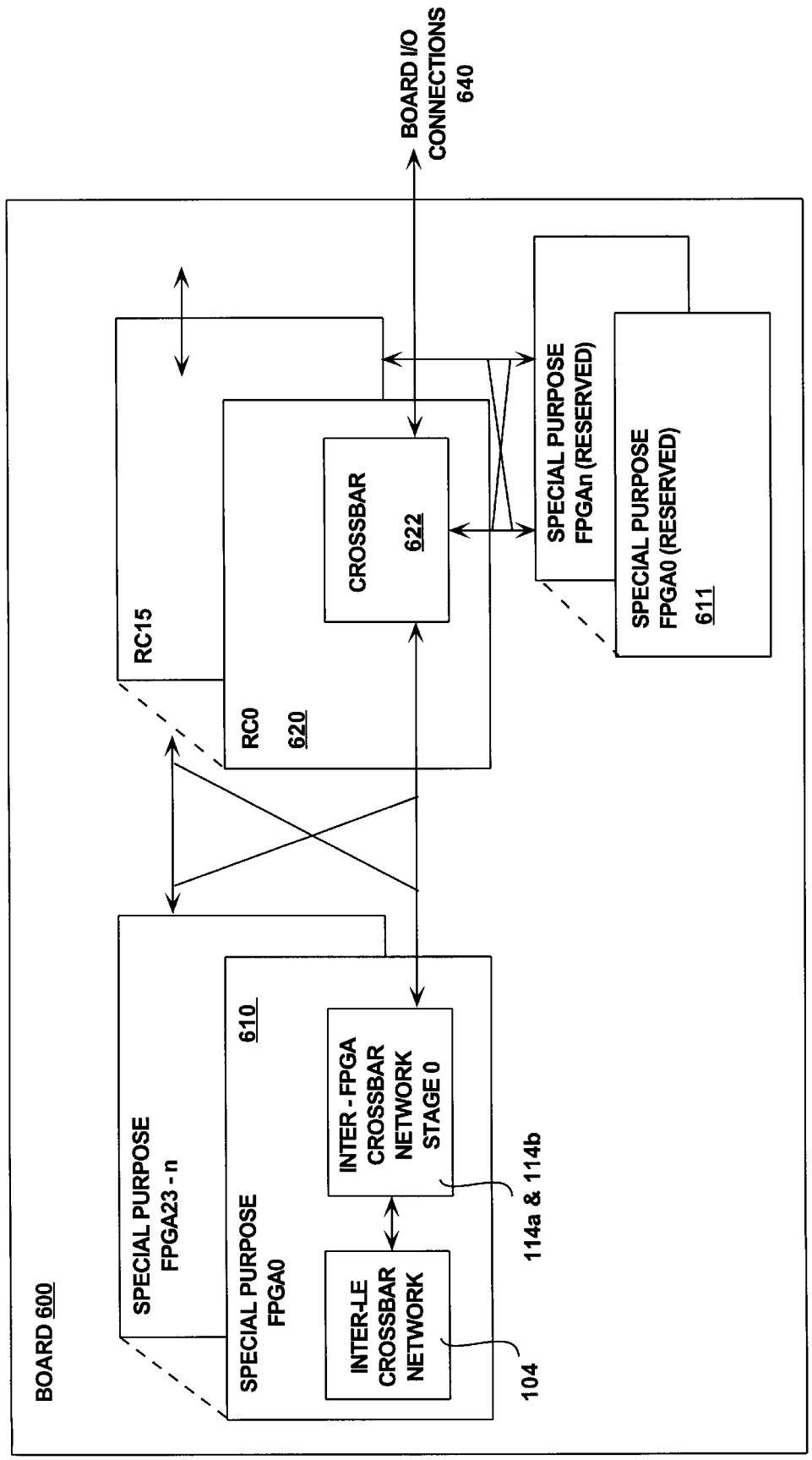
FIG. 6a is a block diagram of a circuit board which can be used in an emulator system according to one embodiment of the present invention.

FIG. 6a is a block diagram of a circuit board which can be used in an emulator system according to one embodiment of the present invention. A circuit board 600 is shown comprising multiple special purpose FPGAs 610 and 611 and routing chips (RCs) 620 coupled to each other in a "butterfly" manner, respectively, as shown. In one implementation, each of the special purpose FPGAs 610 and 611 is a special purpose FPGA 100 of FIG. 3. Each RC 620 comprises a crossbar 622.

The special purpose FPGAs 611 on a circuit board 600 are used for interconnection only; the LEs on these one or more special purpose FPGAs 611 are not used for emulating part of the circuit design. These one or more special purpose FPGAs 611 that are used for interconnection only are shown as "reserved" in FIG. 6a. The exact number of special purpose FPGAs 611 which are used for interconnection only is dependent on the actual circuit design being emulated, as discussed in more detail below.

Recall from the earlier description that inter-FPGA network stage 0 is distributively implemented on special purpose FPGAs 610 and 611. Collectively, RCs 620 implement inter-FPGA network stage 1. The one or more special purpose FPGAs 611 which are reserved for interconnection only implement inter-FPGA network stage 2. Together, the three stages interconnect special purpose FPGAs 610 on circuit board 600 and to the I/O pins 640 of circuit board 600. As will be discussed in more detail below, inter-FPGA network stage 1 also "doubles up" as inter-board network stage 0.

Thus, signals output by any of the special purpose FPGAs 610 can be routed to any other special purpose FPGA 610 on circuit board 600 or routed off-board, either case, through RCs 620 alone, or alternatively through both RCs 620 and reserved special purpose FPGAs 611. Similarly, input signals to circuit board 600 can be routed to any one of the on-board special purpose FPGAs 610 or rerouted off-board.

In the embodiment shown, board 600 includes twenty-four special purpose FPGAs 610 and 611 and sixteen RCs 620. However, it is to be appreciated that alternate embodiments can include different numbers of special purpose FPGAs and RCs.

Figure 6B:
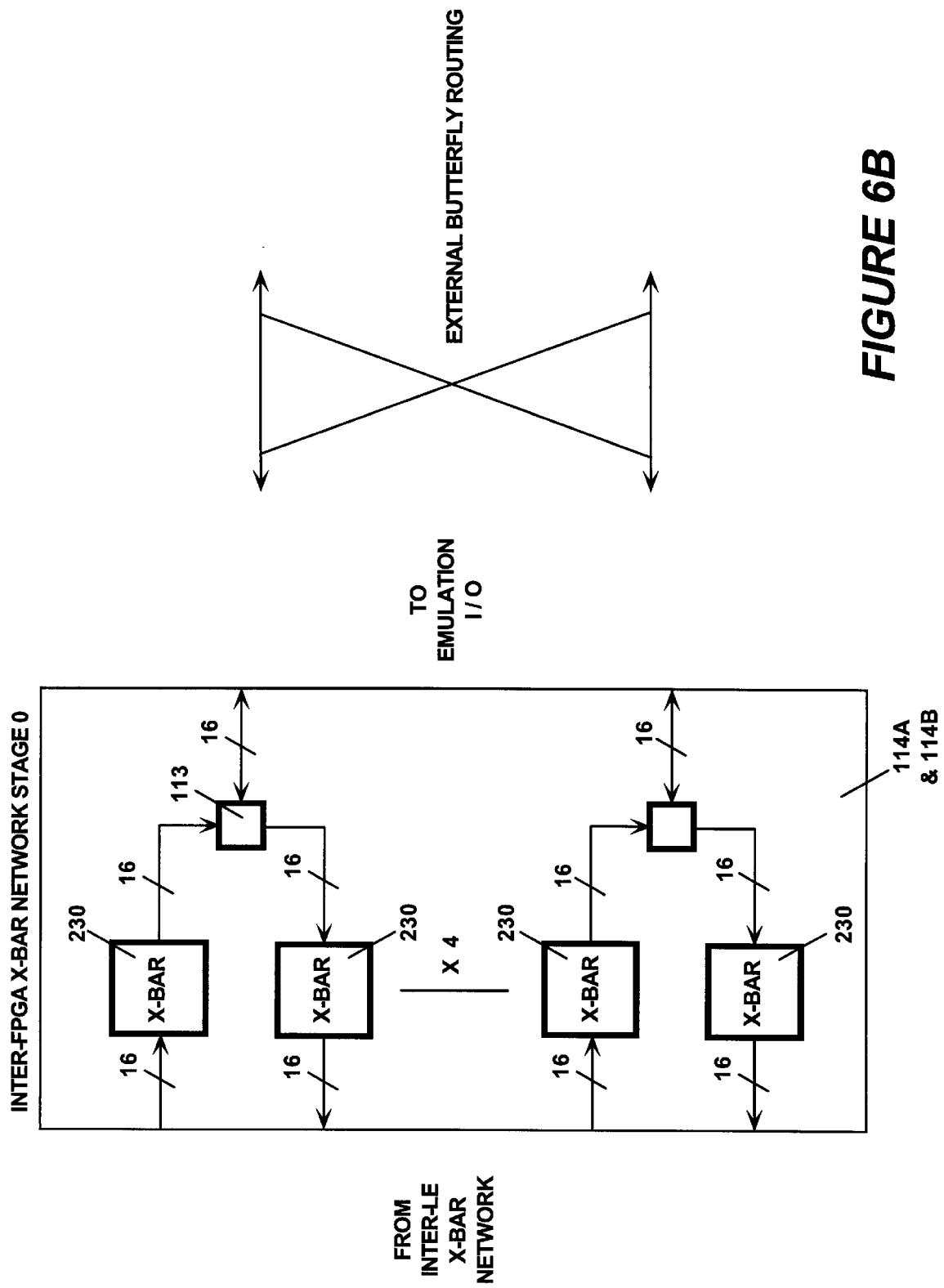
FIG. 6b shows a stage of the inter-FPGA crossbar network in more detail according to one embodiment of the present invention.

FIG. 6b is a block diagram showing one embodiment of a portion of inter-FPGA crossbar network stage 0 114a–114b implemented on a special purpose FPGA. As shown, the portion of inter-FPGA crossbar network stage 0 114a/114b comprises multiple pairs of crossbars 230. Crossbars 230 are coupled to the special purpose FPGA's I/O pins 113 in a pairwise manner.

For the illustrated embodiment, the portion of inter-FPGA crossbar network stage 0 114a–114b comprises 4 pairs or eight 16×16 crossbars 230, and there are 64 I/O pins 113. Each of the 64 I/O pins 113 is coupled to two of eight crossbars 230, one coupling being for input and the second coupling being for output. Four of the eight crossbars 230 are used for input and the remaining four are used for output, as shown The crossbars 230 which are used for input from I/O connections 113 comprise the input portion 114a and the crossbars 230 which are used for output to the I/O connections 113 comprise the output portion 114b.

FIG. 6c is a block diagram showing one embodiment of an RC 620 suitable for use in circuit board 600 in more detail. For the illustrated embodiment, RC 620 includes a 124×124 crossbar 631 for mapping 124 signals to 124 signals. Of the 124 signals, 96 are used to map signals to and from on-board special purpose FPGAs 610, and the remaining 28 are used to map signals in and out of the circuit board 600. In one embodiment, the I/O connections 633 and 634 are physical pins on an RC 620 chip.

The I/O connections 634 are coupled to the I/O pins 113 of the special purpose FPGAs 610 of FIG. 6a. The I/O connections 633 are coupled to the I/O connections 640 of circuit board 600 of FIG. 6a. The I/O connections 633 and 634 can be input to or output from crossbar 631. Each of the I/O connections 633 and 634 can be statically configured to be used as an input or an output connection.

Thus, for the illustrated embodiment, circuit board 600 includes 448 (28×16) I/O connections 640.

Figure 7:
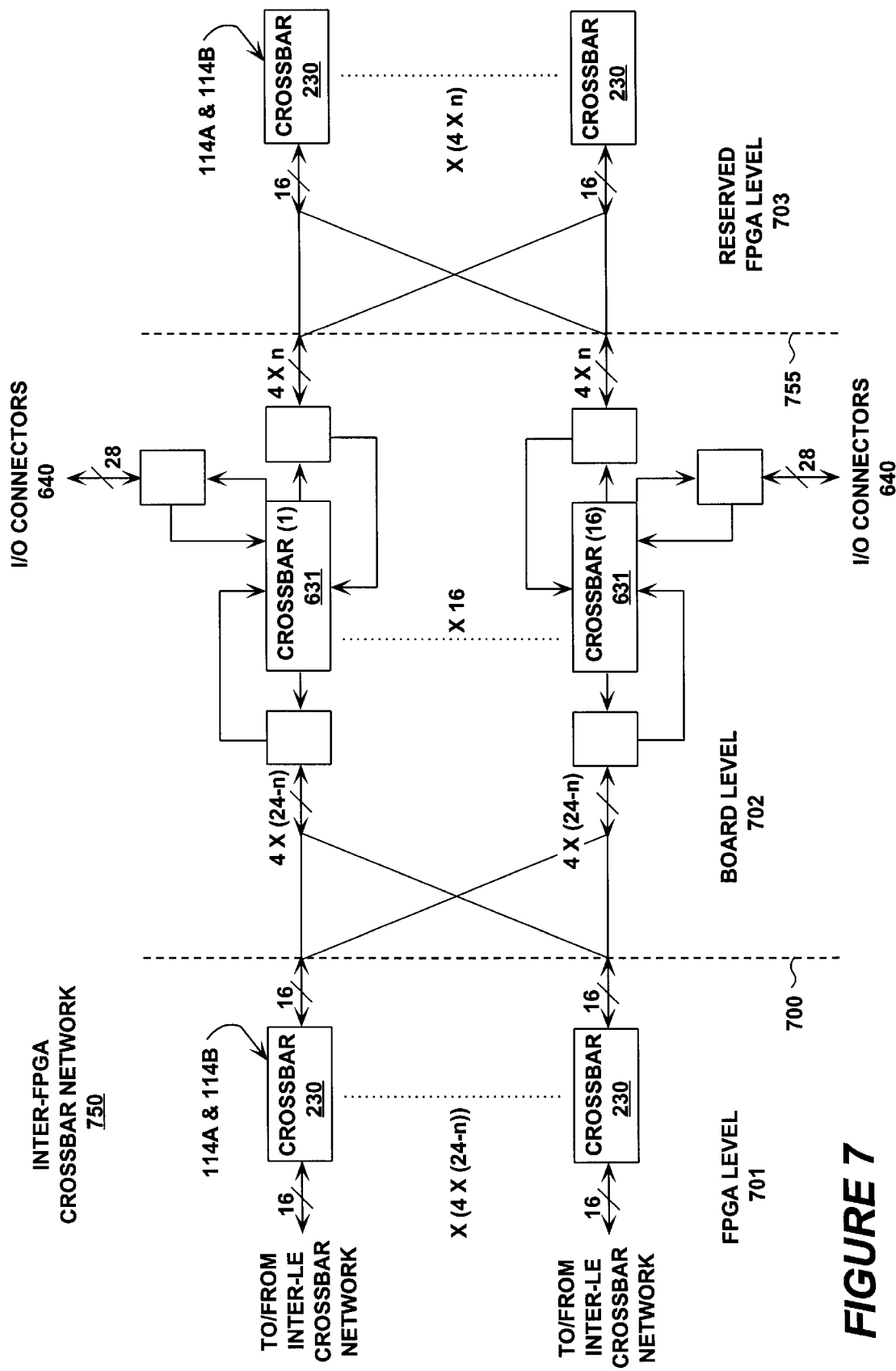
FIG. 7 is a logical view of an inter-FPGA crossbar network according to one embodiment of the present invention.

FIG. 7 is a block diagram showing a logical view of an inter-FPGA hybrid crossbar network according to one embodiment of the present invention. As described earlier, the inter-FPGA crossbar network 750 interconnects the special purpose FPGAs on a circuit board such that signals can be routed between any of the special purpose FPGAs on the circuit board. In addition, the inter-FPGA crossbar network 750 also interconnects the special purpose FPGAs to the circuit board I/O connections so that signals can be routed between the circuit board I/O connections and the special purpose FPGAs.

The routing of signals in the inter-FPGA crossbar network 750 spans both the special purpose FPGA level and the circuit board level. A division line 700 is shown in FIG. 7 which identifies a separation between special purpose FPGA level 701 and board level 702. A division line 755 separates the board level 702 and the reserved special purpose FPGA level 703. Crossbars 230 (corresponding to stage 114a/114b) is implemented in special purpose FPGA 610 of FIG. 6a. The second stage of the inter-FPGA crossbar network, however, is implemented in the board level 702. I/O signals (16) from each of the four crossbars 230 of the 24–n special purpose FPGAs 610 (4×(24–n)) are coupled to the "special purpose FPGA used for logic and interconnection side" of the 16 crossbars 631, and I/O signals (16) from each of the four crossbars 230 of the n special purpose FPGAs 611 (4×n) are coupled to the "special purpose FPGA used for interconnection only side" of the 16 crossbars 631. The number of special purpose FPGAs 611 (in other words, the value of "n") is discussed in more detail below. On the "board-side" of the 16 crossbars 631, 28×16=448 signals are coupled to and from the logic board's I/O connections 640.

The third stage of the inter-FPGA hybrid crossbar network is implemented at the FPGA level with the reserved special purpose FPGAs. As discussed above, one or more of the special purpose FPGAs 610 is reserved to be used for interconnection only. The hybrid nature of the inter-FPGA crossbar network refers to the splitting of the special purpose FPGAs 610, with the LEs of only some of the special purpose FPGAs 610 being used and the remaining special purpose FPGAs 610 being used for interconnection only.

For the above described embodiment, wherein there are 24 special purpose FPGAs 610, each having 64 I/O connections, disposed on circuit board 600, having 448 I/O connections, a total of {(24×64)+448} or {1536+448} are interconnected together by inter-FPGA crossbar network 750.

Having now described the inter-FPGA crossbar network, we now proceed to described the inter-board crossbar network for interconnecting multiple logic boards together and to external devices.

Figure 8:
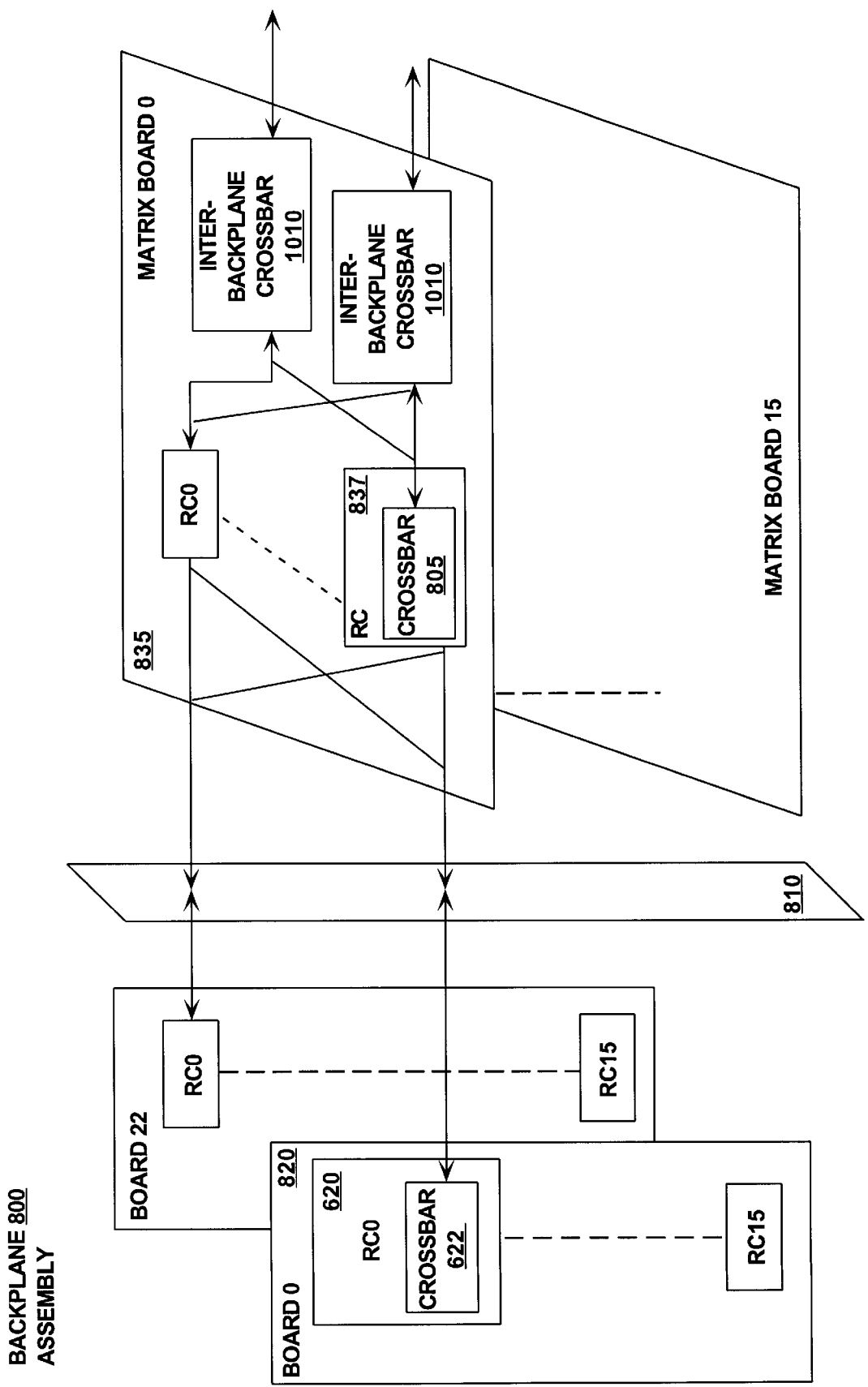
FIG. 8 is a block diagram of a backplane assembly according to one embodiment of the present invention.

FIG. 8 is a block diagram of a backplane assembly according to one embodiment of the present invention. Backplane assembly 800 is used to interconnect circuit boards 820. Circuit boards 820 may be logic boards 600 of FIG. 6a or I/O board for interfacing with external devices. In other words, backplane assembly 800 is used to interconnect special purpose FPGAs disposed on logic boards 600 with each other and with external devices.

Figure 12:
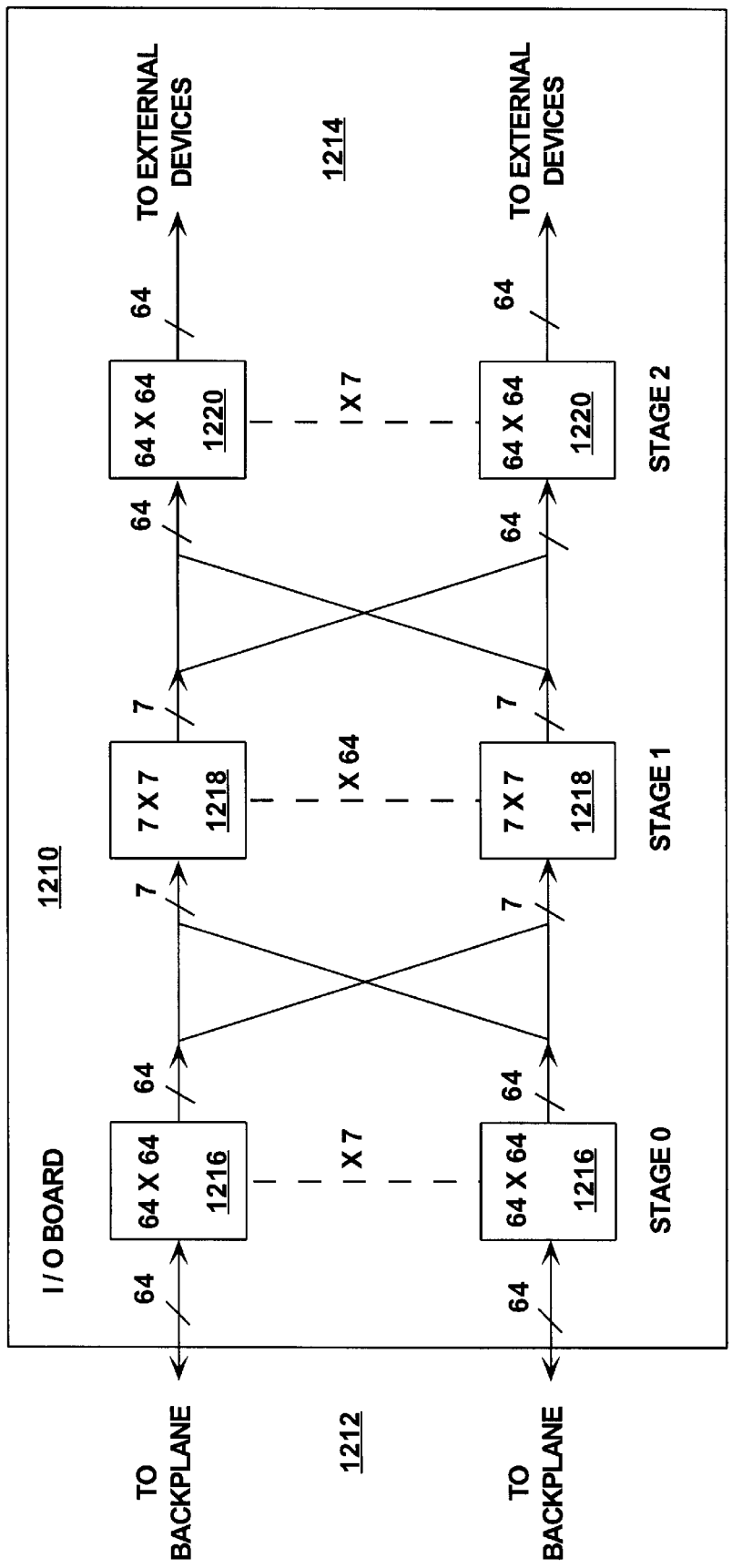
FIG. 12 is a block diagram of an I/O board according to one embodiment of the present invention.

Before describing backplane assembly 800 further, we now skip to FIG. 12, wherein one embodiment of an I/O board is shown. As shown, for the illustrated embodiment, I/O board 1210 comprises two sets of 448 I/O pins 1212 and 1214, and a three stage crossbar network for mapping one set of the 448 signals to the other set of 448 signals, stage 0, stage 1 and stage 2. The first set of 448 signals are used for exchanging signals with backplane assembly 800, whereas the second set of 448 signals are used for exchanging signals with external devices. Thus, I/O board 1210 is completely "interchangeable" with logic board 600 as far as its connection to backplane assembly 800.

As shown, stage 0 comprises seven 64×64 crossbars 1216. Stage 1 in turn comprises sixty-four 7×7 crossbars 1218. Finally, stage 3 also comprises seven 64×64 crossbars 1220.

Returning now to FIG. 8, backplane assembly 800 comprises backplane 810 and a number of matrix boards 835. Backplane 810 is used to accept circuit boards 820, whereas matrix boards 835 are used to interconnect signals to and from the various circuit boards 820.

For the illustrated embodiment, backplane board 810 accepts twenty-three (23) circuit boards 820. Typically, 20 of the 23 circuit boards 820 are logic boards 600 of FIG. 6, whereas the remaining three are I/O boards 1210 of FIG. 12. Sixteen (16) matrix boards 835, each comprising 28 RCs 837, are provided for interconnecting circuit boards 820. (In an alternate embodiment, for ease of manufacturing, multiple RCs 837 are actually combined and implemented using larger "standard" RCs, even if their total pin requirements do not add up to the capacity of the larger "standard" RCs, leaving some of the pins unused.). Additionally, each matrix board 835 is further provided with two RCs 1010 for interconnecting backplane assembly 800 with other backplane assemblies 800, to be described in more detail below.

Recall from earlier description that inter-FPGA crossbar network stage 1 also "doubles up" as inter-board crossbar network stage 0. Collectively, the 16 sets of 28 RCs 805 implement inter-board crossbar network stage 1. Together, the two stages implement the inter-board crossbar network.

Figure 9:
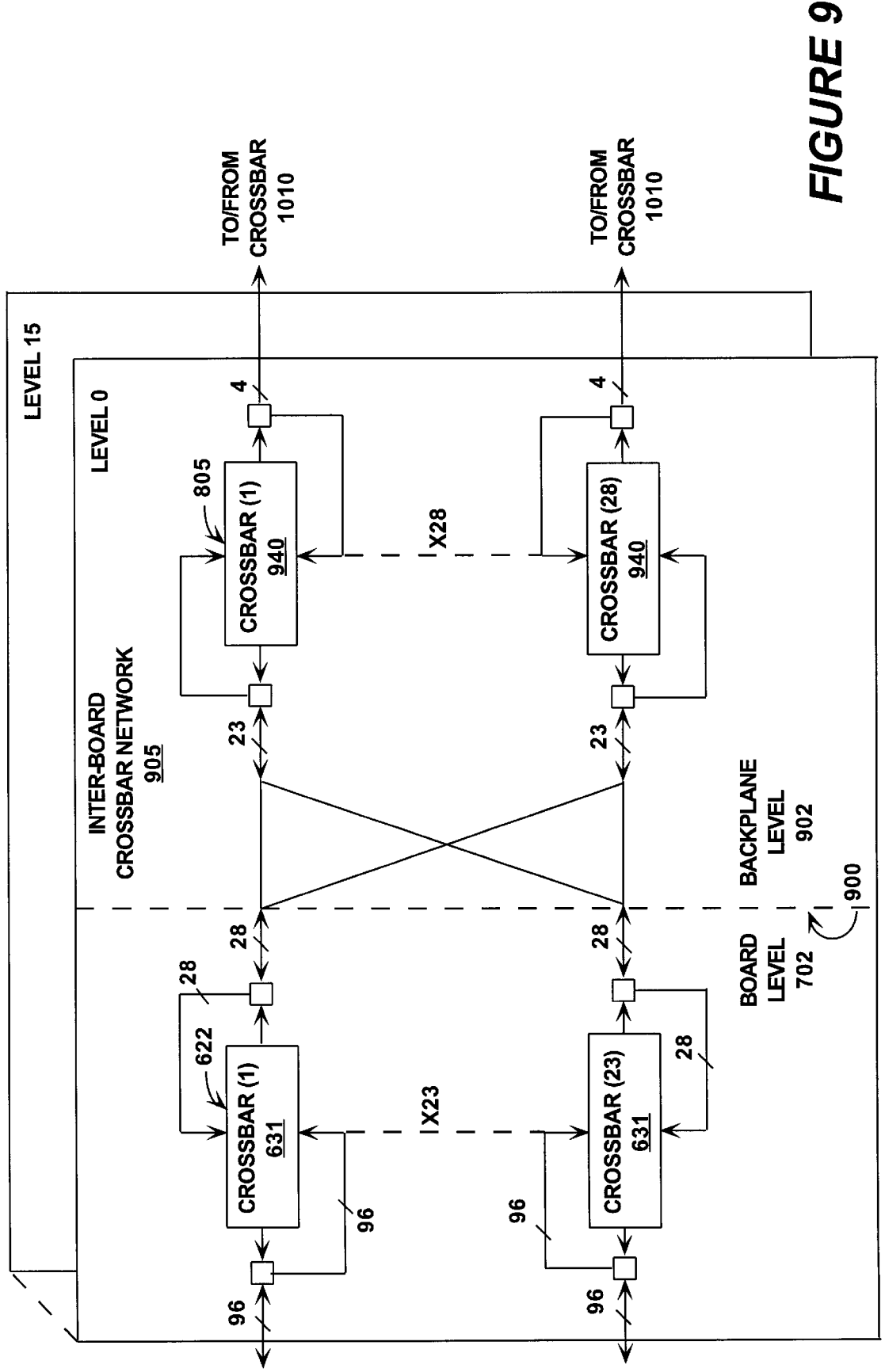
FIG. 9 shows an inter-board crossbar network according to one embodiment of the present invention.

FIG. 9 is a block diagram illustrating a logical view of inter-board crossbar network. As described earlier, inter-board crossbar network 905 spans two physical form levels, i.e. board level 702 and backplane level 902 separated by dotted line 900. As shown, for the illustrated embodiment, stage 0 comprises 23 124×124 crossbars 631, each having 28 board I/O connections, whereas stage 1 comprises 28 27×27 crossbars 940, each having 23 "board-side" I/O connections. The 28 board I/O connections of the 23 crossbars 631 and the 23 "board-side" I/O connections of the 28 crossbars 940 are connected to each other in a "butterfly" manner. Additionally, each crossbar 940 also has 4 "crate-side" I/O connections, to be described more fully below.

Having now described the inter-board crossbar network, we now proceed to describe how backplane assemblies of various crates are interconnected connected together to form a multi-crate system.

Figure 10:
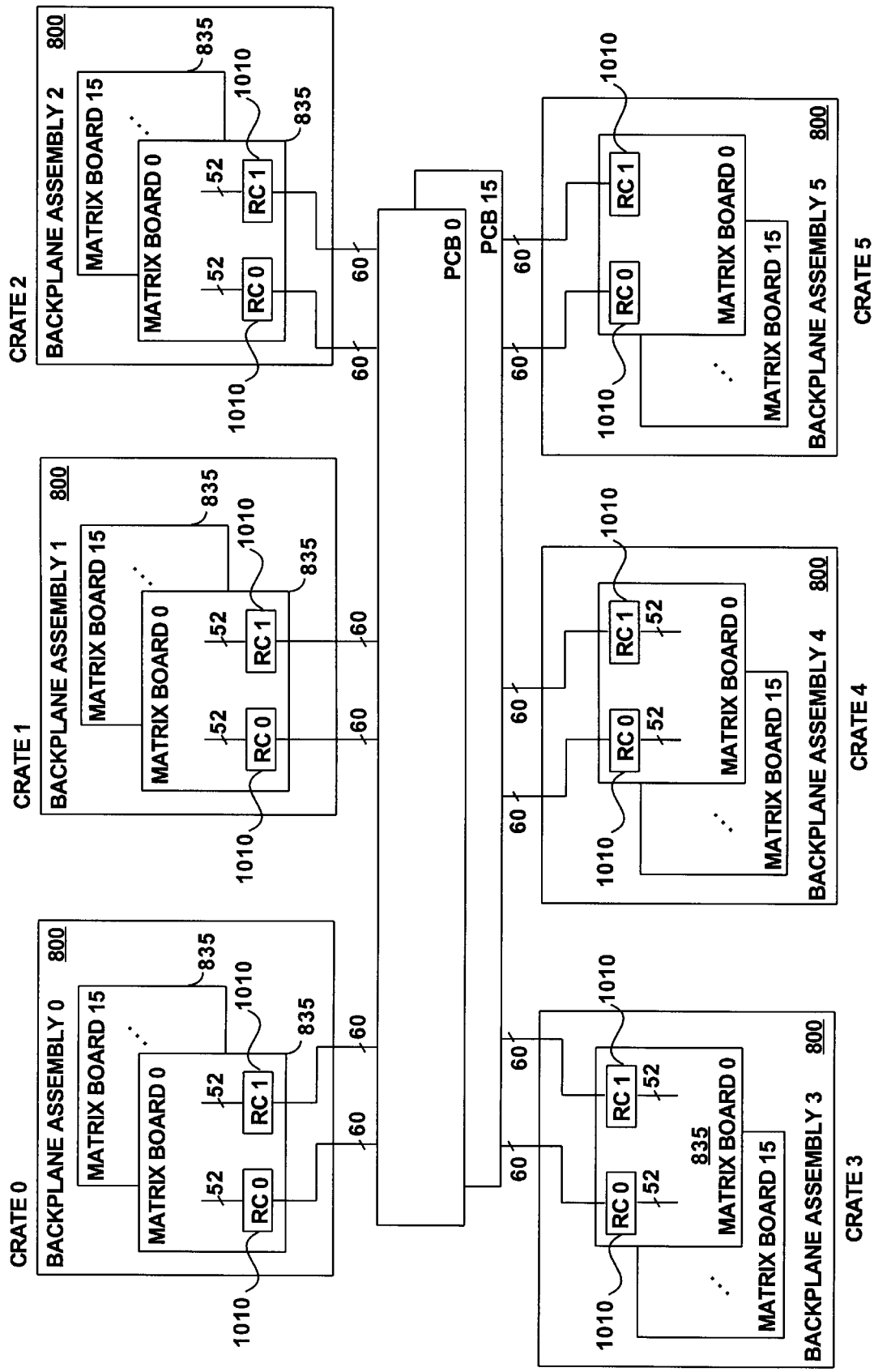
FIG. 10 is a block diagram showing a multi-crate system according to one embodiment of the present invention.
Figure 11:
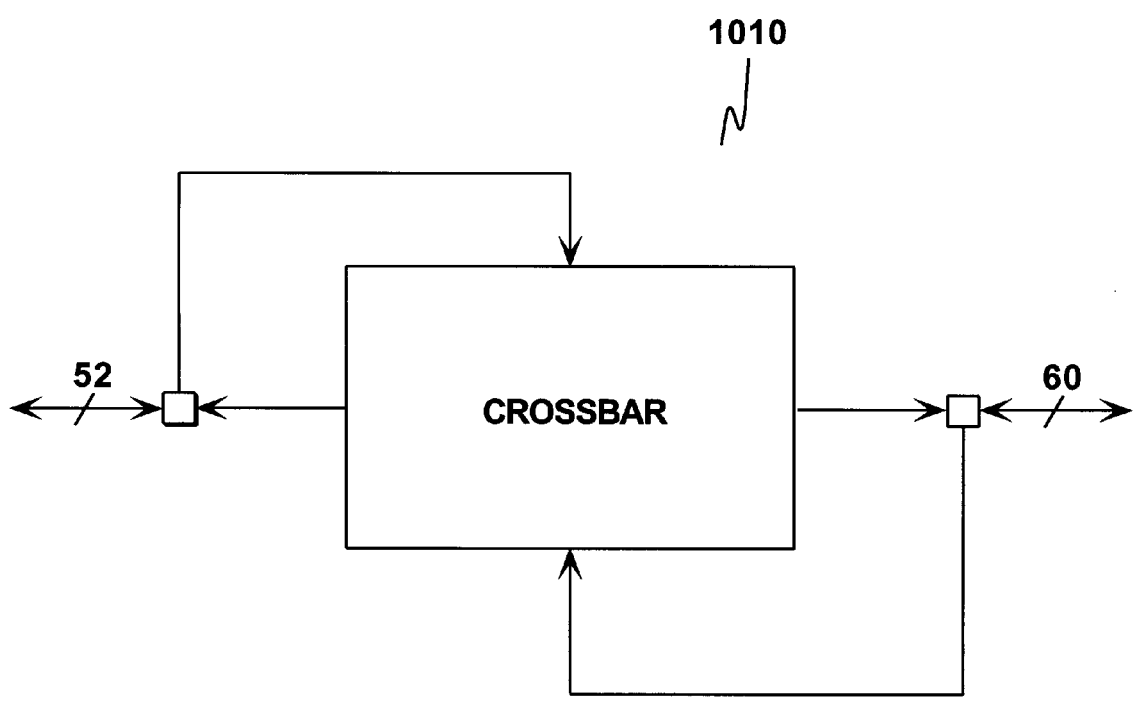
FIG. 11 is a block diagram showing how the backplane assemblies of the various crates are interconnected together according to one embodiment of the present invention.

FIG. 10 is a block diagram showing a multi-crate emulation system according to one embodiment of the present invention. As shown, for the illustrated embodiment, multi-crate emulation system 1000 includes six crates of backplane assemblies 800. As described earlier, each backplane assembly 800 comprises 16 matrix boards 835, with each matrix board having 2 RCs 1010, a first and a second. As described earlier, each RC 1010 has 52 "backplane-side" interconnections coupled to the 4 connections of the 28 RCs 805 on the same matrix board 835. Additionally, each RC 1010 also has 60 "crate-side" interconnections divided into 5 groups of 12 interconnections. FIG. 11 illustrates one embodiment of RC 1010.

Each matrix board 835 is correspondingly coupled to each other through a printed circuit board (PCB) 1025. Each PCB 1025 facilitates a "full crossbar like" interconnection between the first RCs 1010 and between the second RCs 1010 of the backplane assemblies 800. In other words, the five groups of 12 interconnections of the first RC 1010 of the first backplane assembly 800 is coupled to the first group of 12 interconnections of the first RC 1010 of the second, third, fourth, fifth and sixth backplane assembly 800. The remaining four groups of 12 interconnections of the first RC 1010 of the second backplane assembly 800 are coupled to the second group of 12 interconnections of the first RC 1010 of the third, fourth, fifth and sixth backplane assembly 800. The remaining three groups of 12 interconnections of the first RC 1010 of the third backplane assembly 800 are coupled to the third group of 12 interconnections of the first RC 1010 of the fourth, fifth and sixth backplane assembly 800, and so forth.

Figure 13:
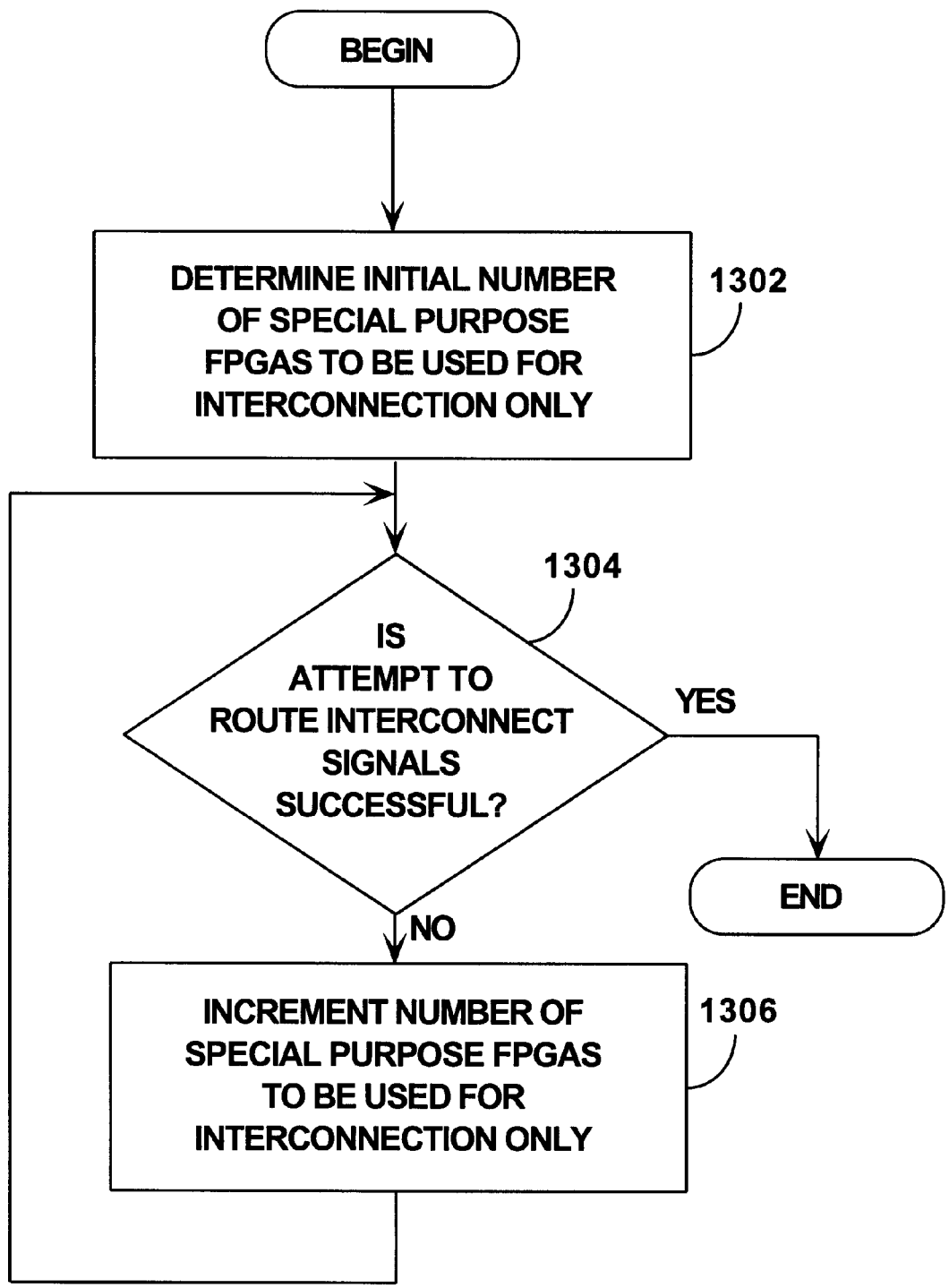
FIG. 13 shows the steps followed in determining a number of special purpose FPGAs which will be used for interconnection only according to one embodiment of the present invention.

FIG. 13 shows the steps followed in determining a number of special purpose FPGAs 611 which will be used for interconnection only according to one embodiment of the present invention. In one embodiment, the steps illustrated in FIG. 13 are performed by mapping software 22 of FIG. 1.

As is shown in FIG. 13, the mapping software 22 sets aside an initial number of special purpose FPGAs 611 to be used for interconnection only, step 1302. The mapping software 22 then attempts to interconnect the LEs of the logic board 600; this attempt is either successful or unsuccessful, step 1304. If the attempt is successful, then the process is complete. However, if the attempt is unsuccessful, then the mapping software 22 increments the number of special purpose FPGAs 611 to be used for interconnection only (decrements the number of special purpose FPGAs 610 available for logic mapping), step 1306. The process then returns to step 1304, and the mapping software 22 again attempts to interconnect the LEs of the circuit board 600.

In one embodiment of the present invention, the initial number of special purpose FPGAs in step 1302 is one. Also in this embodiment, the number of special purpose FPGAs 611 is incremented by one in step 1306, up to a maximum of one less than the number of special purpose FPGAs 610 on the circuit board 600 (e.g., twenty-three). However, it is to be appreciated that the initial number, the increment number, and the maximum number of special purpose FPGAs 611 can be different in alternate embodiments.

Thus, it can be seen that the present invention attempts to utilize the LEs in as many of the special purpose FPGAs 610 as possible. The present invention continually reduces the number of special purpose FPGAs 610 whose LEs are utilized until the portion of the circuit to be mapped onto the board 600 can be interconnected in accordance with the circuit design being mapped. It is to be appreciated that the amount of logic which can actually be mapped onto the board 600 decreases as the number of special purpose FPGAs 610 whose LEs are utilized decreases.

In one embodiment of the present invention, somewhere between one and twenty-three of the special purpose FPGAs 611 are reserved for interconnection use only. It is to be appreciated that the number of special purpose FPGAs 611 reserved for interconnection only on different circuit boards 600 can vary. The exact number of special purpose FPGAs 611 which are used for interconnection only on a particular logic board 600 is determined as discussed above with reference to FIG. 13. Experience has shown that this reconfigurable hybrid manner of interconnecting greatly enhances the flexibility of the programmable interconnect at the board level.

It should be noted that although the present invention is illustrated above using special purpose field programmable gate arrays, those skilled in the art will appreciate that the present invention can be practiced with other reprogrammable logic devices.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, an emulation system employing a scalable multi-level multi-stage hybrid programmable interconnect network has been described.

What is claimed is:

1. A method of emulating a circuit design in a system having a plurality of field programmable gate arrays (FPGAs) interconnected with a plurality of routing chips, wherein each FPGA of the plurality of FPGAs includes a plurality of reconfigurable logic elements (LEs), the method comprising the steps of:

(a) reserving a number of FPGAs of the plurality of FPGAs to be used for interconnecting unreserved ones of the plurality of FPGAs, wherein each FPGA of the plurality of FPGAs includes an on-chip subset of a first stage of an inter-FPGA network, wherein each of the plurality of routing chips includes an on-chip subset of a second stage of the inter-FPGA network, and wherein the reserved ones of the plurality of FPGAs forms a third stage of the inter-FPGA network;

(b) mapping a portion of the circuit design onto the unreserved ones of the plurality of FPGAs;

(c) attempting to interconnect the reconfigurable LEs of the unreserved ones of the plurality of FPGAs in accordance with the circuit design;

(d) increasing the number of reserved ones of the plurality of FPGAs which will only be used for interconnecting the unreserved ones of the plurality of FPGAs responsive to the attempting step (c) failing; and (e) repeating the attempting step (c).

2. The method of claim 1, wherein the increasing step (d) comprises the step of reserving a previously unreserved one of the plurality of FPGAs.

3. A logic board comprising:

a plurality of board input/output (I/O) pins;

a first plurality of field programmable gate arrays (FPGAs), each having a plurality of reconfigurable logic elements (LEs) for emulating circuit elements of a circuit design, a plurality of FPGA I/O pins, an on-chip multi-stage inter-LE network of programmable interconnect devices (PIDs) coupled to the FPGA I/O pins and the reconfigurable LEs for selectively interconnecting the reconfigurable LEs to each other and to the FPGA I/O pins, and an on-chip subset of a first stage of an inter-FPGA network of PIDs disposed in between the FPGA I/O pins and the inter-LE network of PIDs for interconnecting the FPGA to other FPGAs and to board I/O pins;

a second stage of the inter-FPGA network of PIDs coupled to the FPGAs and the board I/O pins for cooperating with the on-chip first stage of the inter-FPGA network of PIDs distributively implemented on the FPGAs for interconnecting the FPGAs to each other and to the board I/O pins; and a third stage of the inter-FPGA network of PIDs, wherein the third stage comprises at lease one FPGA, and wherein each FPGA of the third stage is used only for interconnecting the plurality of FPGAs.

4. The logic board as set forth in claim 3, wherein the second stage of the inter-FPGA network of PIDs comprises a plurality of PIDs coupled to the PIDs at the first stage of the inter-FPGA network for interconnecting the FPGA I/O pins to each other and to the logic board I/O pins.

5. The logic board as set forth in claim 3, wherein the second stage of the inter-FPGA network of PIDs also serves as a first stage of an inter-logic board network of PIDs for interconnecting the logic board to other logic boards and one or more I/O boards.

6. A logic board comprising:

a plurality of board input/output (I/O) pins;

a first plurality of reprogrammable logic devices (RLDs), each having a plurality of reconfigurable logic elements (LEs) for emulating circuit elements of a circuit design, a plurality of RLD I/O pins, an on-chip multi-stage inter-LE network of programmable interconnect devices (PIDs) coupled to the RLD I/O pins and the reconfigurable LEs for selectively interconnecting the reconfigurable LEs to each other and to the RLD I/O pins, and an on-chip subset of a first stage of an inter-RLD network of PIDs disposed in between the RLD I/O pins and the inter-LE network of PIDs for interconnecting the RLD to other RLDs and to board I/O pins;

a second stage of the inter-RLD network of PIDs coupled to the RLDs and the board I/O pins for cooperating with the on-chip first stage of the inter-RLD network of PIDs distributively implemented on the RLDs for interconnecting the RLDs to each other and to the board I/O pins; and a third stage of the of the inter-RLD network of PIDs, wherein the third stage comprises at lease one RLD, and wherein each RLD in the third stage is used only for interconnecting the plurality of RLDs.

7. The logic board as set forth in claim 6, wherein the second stage of the inter-RLD network of PIDs comprises a plurality of PIDs coupled to the PIDs at the first stage of the inter-RLD network for interconnecting the RLD I/O pins to each other and to the logic board I/O pins.

8. The logic board as set forth in claim 6, wherein the second stage of the inter-RLD network of PIDs also serves as a first stage of an inter-logic board network of PIDs for interconnecting the logic board to other logic boards and one or more I/O boards.

* * * * *